(12) United States Patent
Iwata (10) Patent No.: US 10,114,518 B2
(45) Date of Patent: Oct. 30, 2018

(54) INFORMATION PROCESSING SYSTEM, INFORMATION PROCESSING DEVICE, AND SCREEN DISPLAY METHOD

(71) Applicant: Keishi Iwata, Kanagawa (JP)

(72) Inventor: Keishi Iwata, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 359 days.

(21) Appl. No.: 14/943,119

(22) Filed: Nov. 17, 2015

(65) Prior Publication Data

US 2016/0147379 A1    May 26, 2016

(30) Foreign Application Priority Data

Nov. 20, 2014    (JP) .................................. 2014-235857

(51) Int. Cl.
*G06F 3/048* (2013.01)
*G06F 3/0481* (2013.01)
*G06F 3/0484* (2013.01)

(52) U.S. Cl.
CPC ........ *G06F 3/0481* (2013.01); *G06F 3/04842* (2013.01)

(58) Field of Classification Search
CPC ........................... G06F 3/0481; G06F 3/04842
USPC ......................................................... 715/802
See application file for complete search history.

(56) References Cited

U.S. PATENT DOCUMENTS

| | | | | |
|---|---|---|---|---|
| 9,213,403 B1* | 12/2015 | Raffle | ...................... | G06F 3/011 |
| 9,369,768 B1* | 6/2016 | Mandel | ............ | H04N 21/47205 |
| 9,785,231 B1* | 10/2017 | Zimmerman | ........... | G06F 3/012 |
| 9,811,154 B2* | 11/2017 | Raffle | ...................... | G06F 3/012 |
| 9,992,419 B2* | 6/2018 | Nielsen | .............. | H04N 5/23293 |
| 2010/0122166 A1* | 5/2010 | Chien | .................. | G06F 3/04817 715/716 |
| 2010/0205566 A1* | 8/2010 | Matoba | .................. | G06F 3/0488 715/838 |
| 2012/0098733 A1* | 4/2012 | Masuda | ................ | G06F 3/1454 345/2.2 |
| 2016/0147379 A1* | 5/2016 | Iwata | .................... | G06F 3/0481 715/802 |
| 2016/0170698 A1* | 6/2016 | Yamashita | ............ | G06F 3/1256 715/274 |

(Continued)

FOREIGN PATENT DOCUMENTS

| | | |
|---|---|---|
| JP | 2803236 | 7/1998 |
| JP | 11-85635 | 3/1999 |

(Continued)

OTHER PUBLICATIONS

Jun. 12, 2018 Japanese official action in connection with corresponding Japanese patent application No. 2014-235857.

*Primary Examiner* — David Phantana-angkool
(74) *Attorney, Agent, or Firm* — Cooper & Dunham LLP (57) ABSTRACT

A display control unit that displays a screen that transitions to a next screen based on a predetermined input made by a user on a display unit; and a determining unit that determines, when the screen is displayed and the predetermined input has not been made, whether a display condition for a preview for next screen to let the user view the next screen in advance is satisfied are included, and the display control unit displays the preview for next screen on the display unit when the display condition is satisfied.

12 Claims, 7 Drawing Sheets

(56) References Cited

U.S. PATENT DOCUMENTS

2016/0291806 A1\* 10/2016 Civiero ................ G06F 3/0482
2017/0344326 A1\* 11/2017 Yagiura ................ G06F 3/1292

FOREIGN PATENT DOCUMENTS

| JP | 2002-41220 | 2/2002 |
| JP | 2005-228228 | 8/2005 |
| JP | 2008-065784 | 3/2008 |
| JP | 2014-38444 | 2/2014 |
| WO | 2013/157322 A1 | 10/2013 |

\* cited by examiner

INFORMATION PROCESSING SYSTEM, INFORMATION PROCESSING DEVICE, AND SCREEN DISPLAY METHOD

CROSS-REFERENCE TO RELATED APPLICATIONS

The present application claims priority to and incorporates by reference the entire contents of Japanese Patent Application No. 2014-235857 filed in Japan on Nov. 20, 2014.

BACKGROUND OF THE INVENTION

1. Field of the Invention

The present invention relates to an information processing system, an information processing device, and a screen display method.

2. Description of the Related Art

Conventionally, for example, a technique has been known in which a function of an object is explained by moving a function explanation icon onto the object in a screen (for example, Japanese Patent No. 2803236).

SUMMARY OF THE INVENTION

It is an object of the present invention to at least partially solve problems in the conventional technology.

According to an aspect of the present invention, there is provided an information processing system including: a display control unit that displays a screen that transitions to a next screen based on a predetermined input made by a user on a display unit; and a determining unit that determines, when the screen is displayed and the predetermined input has not been made, whether a display condition for a preview for next screen to let the user view the next screen in advance is satisfied, wherein the display control unit displays the preview for next screen on the display unit when the display condition is satisfied.

According to another aspect of the present invention, there is provided an information processing device including: a display control unit that displays a screen that transitions to a next screen based on a predetermined input made by a user on a display unit; and a determining unit that determines, when the screen is displayed and the predetermined input has not been made, whether a display condition for a preview for next screen to let the user view the next screen in advance is satisfied, wherein the display control unit displays the preview for next screen on the display unit when the display condition is satisfied.

According to still another aspect of the present invention, there is provided a screen display method including: displaying a screen that transitions to a next screen based on a predetermined input made by a user on a display unit; determining, when the screen is displayed and the predetermined input has not been made, whether a display condition for a preview for next screen to let the user view the next screen in advance is satisfied; and displaying the preview for next screen on the display unit when the display condition is satisfied.

The above and other objects, features, advantages and technical and industrial, significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments of an information processing system, an information processing device, and a screen display method and program are explained in detail below with reference to the accompanying drawings.

Figure 1:
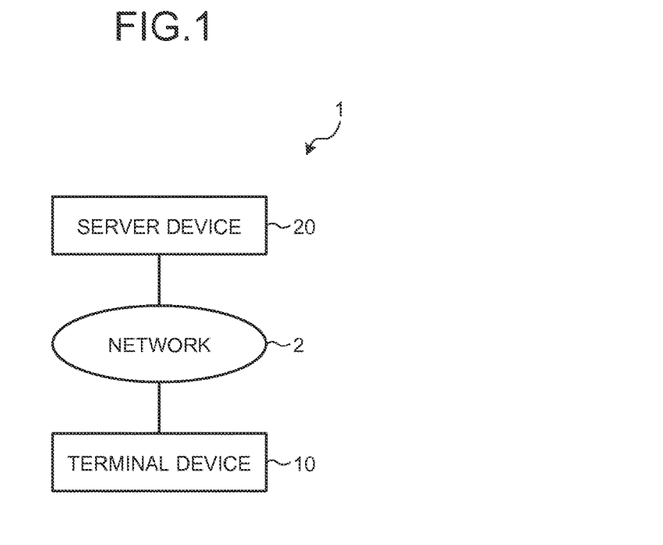
FIG. 1 is a block diagram showing one example of a configuration of an information processing system of a present embodiment.

FIG. 1 is a block diagram showing one example of a configuration of an information processing system 1 of a present embodiment. As shown in FIG. 1, the information processing system 1 includes a terminal device 10 (one example of the information processing device) and a server device 20.

The terminal device 10 and the server device 20 are connected through a network 2. The network 2 includes, for example, the Internet, a local area network (LAN), and the like.

The terminal device 10 includes, for example, an image forming device, such as a printing device, a copier, a multifunction peripheral, a scanner device, and a facsimile device, a projector, a videoconference device, an electronic black board, a fluorescent lamp, a camera, an air conditioner, a refrigerator, a vending machine, an industrial device, a general-purpose personal computer (PC), a smart a tablet terminal, a wearable terminal, and the like.

The server 20 is implemented by at least one unit of computer.

Figure 2:
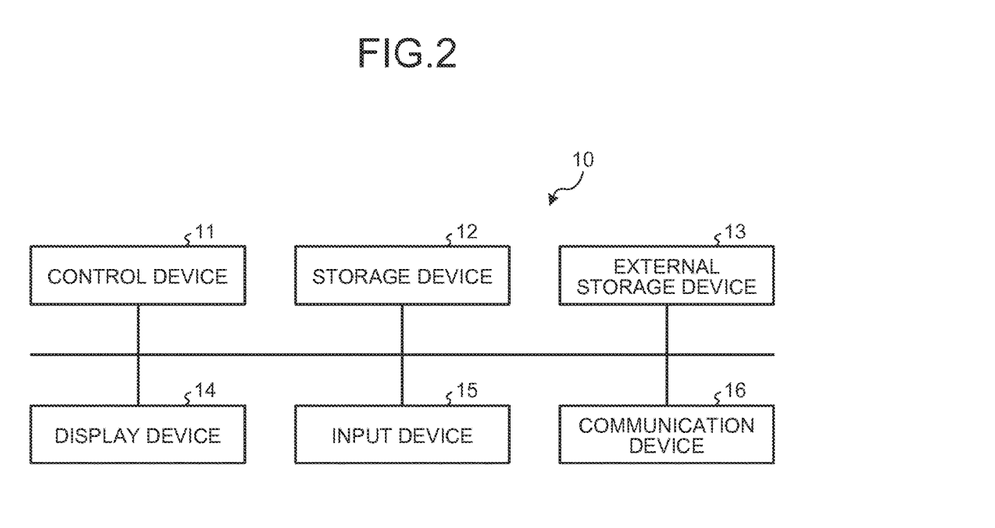
FIG. 2 is a block diagram showing one example of a hardware configuration of a terminal device of the present embodiment.

FIG. 2 is a block diagram showing one example of a hardware configuration of the terminal device 10 of the present embodiment. As shown in FIG. 2, the terminal device 10 include a control device 11 such as a central processing unit (CPU) and a graphics processing unit (CPU), a storage device 12 such as a read only memory (ROM) and a random access memory (RAM), an external storage device 13 such as a hard disk drive (HDD) and a solid state drive (SSD), a display device 14 such as a display, an input device 15, such as a mouse, a keyboard, a touch panel, or a key switch, and a communication device 16 such as a communication interface to perform communication through the network 2, and has a hardware configuration using an ordinary computer.

Figure 3:
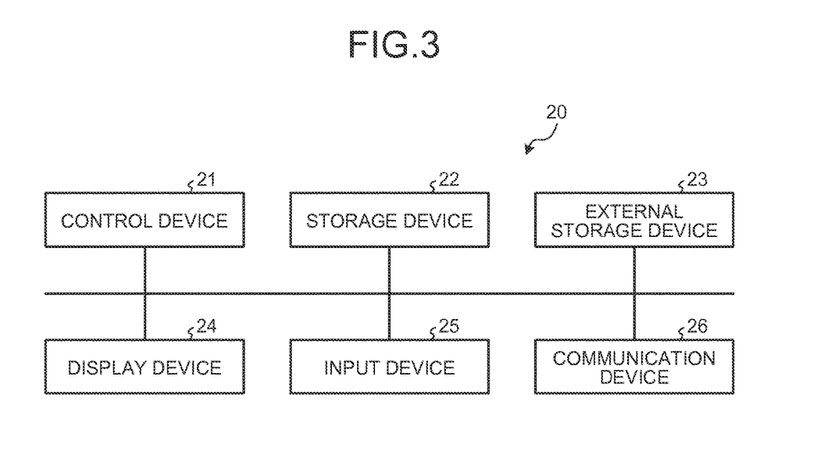
FIG. 3 is a block diagram showing one example of a hardware configuration of a server device of the present embodiment.

FIG. 3 is a block diagram showing one example of a hardware configuration of the server device 20 of the present embodiment. As shown in FIG. 3, the server device 20 includes a control device 21 such as a CPU and a GPU, a storage device 22 such as a ROM and a RAM, an external storage device 23 such as a HDD and an SSD, a display device 24 such as a display, an input, device 25 such as a mouse and a keyboard, and a communication device 26 such as a communication interface to perform communication through the network 2, and has a hardware configuration using an ordinary computer.

Figure 4:
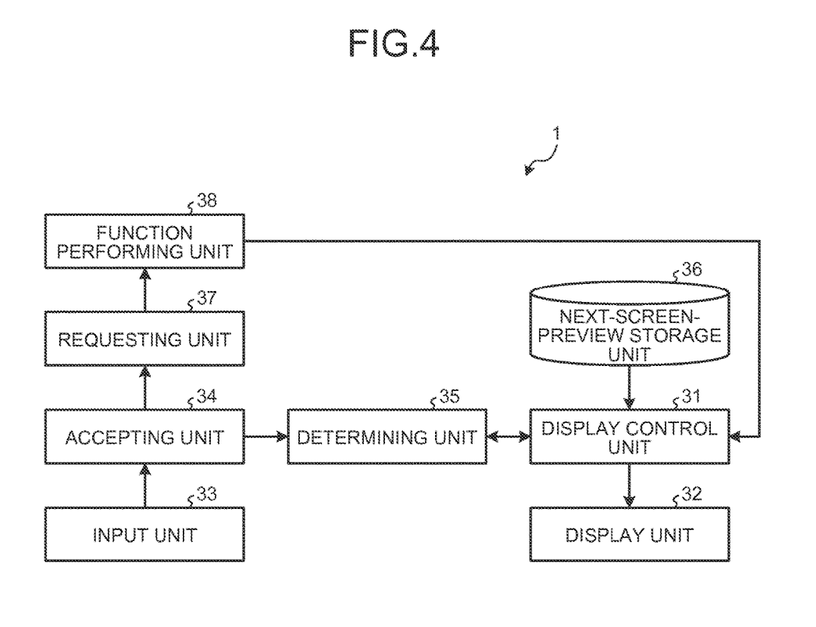
FIG. 4 is a block diagram showing one example of a functional configuration of the information processing system of the present embodiment.

FIG. 4 is a block diagram showing one example of a functional configuration of the information processing system 1 of the present embodiment. As shown in FIG. 4, the information processing system 1 includes a display control unit 31, a display unit 32, an input unit 33, an accepting unit 34, a determining unit 35, a next-screen-preview storage unit 36, a requesting unit 37, and a function performing unit 38.

In the present embodiment, an example in which the terminal device 10 includes the display control unit 31, the display unit 32, the input unit 33, the accepting unit 34, the determining unit 35, the next-screen-preview storage unit 36, and the requesting unit 37, and the server device 20 includes the function performing unit 38 is explained; however, it is not limited thereto.

As long as the terminal device 10 includes the display unit 32 and the input unit 33, the display control unit 31, the accepting unit 34, the determining unit 35, the next-screen-preview storage unit 36, the requesting unit 37, and the function performing unit 38 may be included in either of the terminal device 10 or the server device 20. Moreover, it may be configured such that the terminal device 10 includes the display control unit 31, the display unit 32, the input, unit 33, the accepting unit 34, the determining unit 35, the next-screen-preview storage unit 36, the requesting unit 37, and the function performing unit 38, and the server device 20 is not used.

In the present embodiment, the display control unit 31, the accepting unit 34, and the determining unit 35 can be implemented by, for example, the control device 11 and the storage device 12, and the display unit 32 can be implemented by, for example, the display device 14, and the input unit 33 can be implemented by, for example, the input device 15, and the next-screen-preview storage unit 36 can be implemented by, for example, at least either one of the storage device 22 and the external storage device 23, and the requesting unit 37 can be implemented by, for example, the control device 11, the storage device 12, and the communication device 16, and the function performing unit 38 can be implemented by, for example, the control device 21, the storage device 22, and the communication device 26.

The display control unit 31 displays a screen on the display unit 32. For example, the display control unit 31 displays a screen that is transmitted from the function performing unit 38 on the display unit 32. This screen is a screen that transitions to a next screen based on a predetermined input made by a user.

Although an example in which the predetermined input is an input of selecting a command button (one example of a transition symbol) that indicates transition to a next screen by using a cursor (one example of a specification symbol) that moves based on an operation of a user is explained in the present embodiment, it is not limited thereto. For example, if the display unit 32 is a touch panel display, the predetermined input may be an input of selecting the command button that indicates transition to a next screen with a finger of a user himself/herself or a touch pen.

Figure 5:
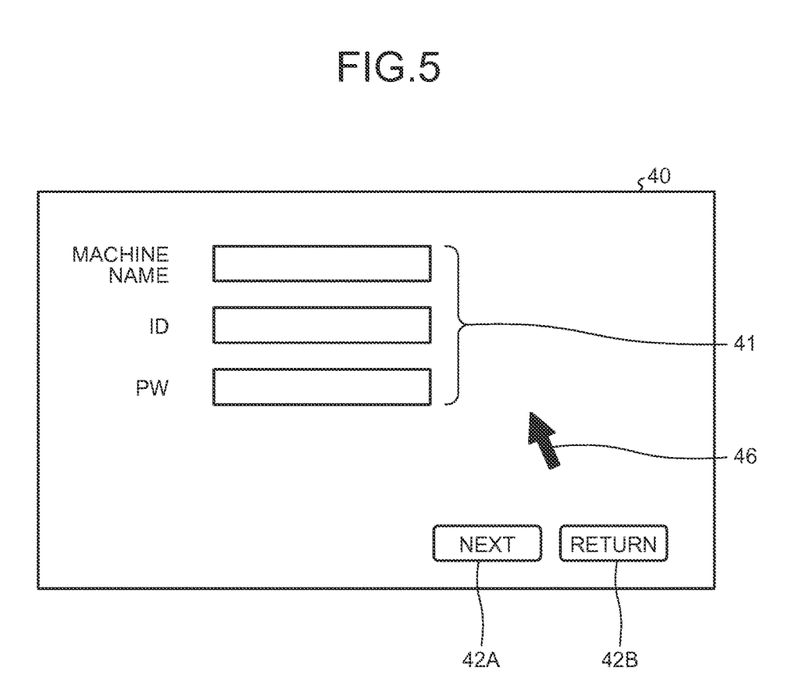
FIG. 5 depicts one example of a screen of the present embodiment.

FIG. 5 depicts one example of a screen 40 of the present embodiment. In the example shown in FIG. 5, the screen 40 is one example of a verification screen, and a textbox 41 to input a machine name, an identification (ID), and a password (PW), a command button 42A to cause verification with information input into the textbox 41, and to transition (proceed) to a next screen that displays a verification result, and a command button 42B to transition (return) to a previous screen are arranged therein. In the example shown in FIG. 5, the predetermined input can be an input of selecting the command button 42A with a cursor 46.

The accepting unit 34 accepts various kinds of input made by a uses to a screen that is displayed on the display unit 32 from the input unit 33. In the example shown in FIG. 5, the various kinds of input includes an input to move the cursor 46, an input of data to she textbox 41, an input of selecting the command button 42A and the command Button. 42B, and the like.

The determining unit 35 determines whether a display condition for displaying a preview for next screen to let a user view the next screen in advance is satisfied when the screen is being displayed and the predetermined input has not been made. As the display condition, for example, a condition that transition of a screen has not occurred for a predetermined time (for example, 30 seconds) since a screen is displayed is included.

In the example shown in FIG. 5, when the screen 40 is displayed by the display control unit 31, the determining unit 35 checks whether an input of selecting the command button 42A or the command button 42B is accepted by the accepting unit 34, and determines that the display condition is satisfied if an input of selecting the command button 42A or the command button 42B has not been accepted for a predetermined time since the screen 40 is displayed.

The next-screen-preview storage unit 36 stores a preview for next screen.

The display control unit 31 is explained herein again.

When determined that the display condition is satisfied by the determining unit 35, the display control unit 31 acquires the preview for next screen from the next-screen-preview storage unit 36, to display on the display unit 32.

The preview for next screen can be, for example, a screen that is obtained by manipulating a next screen. Furthermore, for example, when a region in which data input by a user is displayed is present in the next screen, the preview for next screen can be a screen in which information to mask the data is arranged in a region in the preview for next screen that corresponds to the region. Moreover, for example, the preview for next screen can be a screen in which an estimated transition time that is estimated to be required to transition from a screen to a next screen is arranged. Furthermore, for example, the preview for next screen can be a screen that shows whether transition from a next screen to a screen is possible in an emphasized manner. Moreover, for example, the preview for next screen can be a screen in a display different from a display mode of a next screen. Furthermore, for example, when there are multiple kinds of next screens are present, the preview for next screen can be a screen in which screens that are different in a display mode per next screen are collected.

Figure 6:
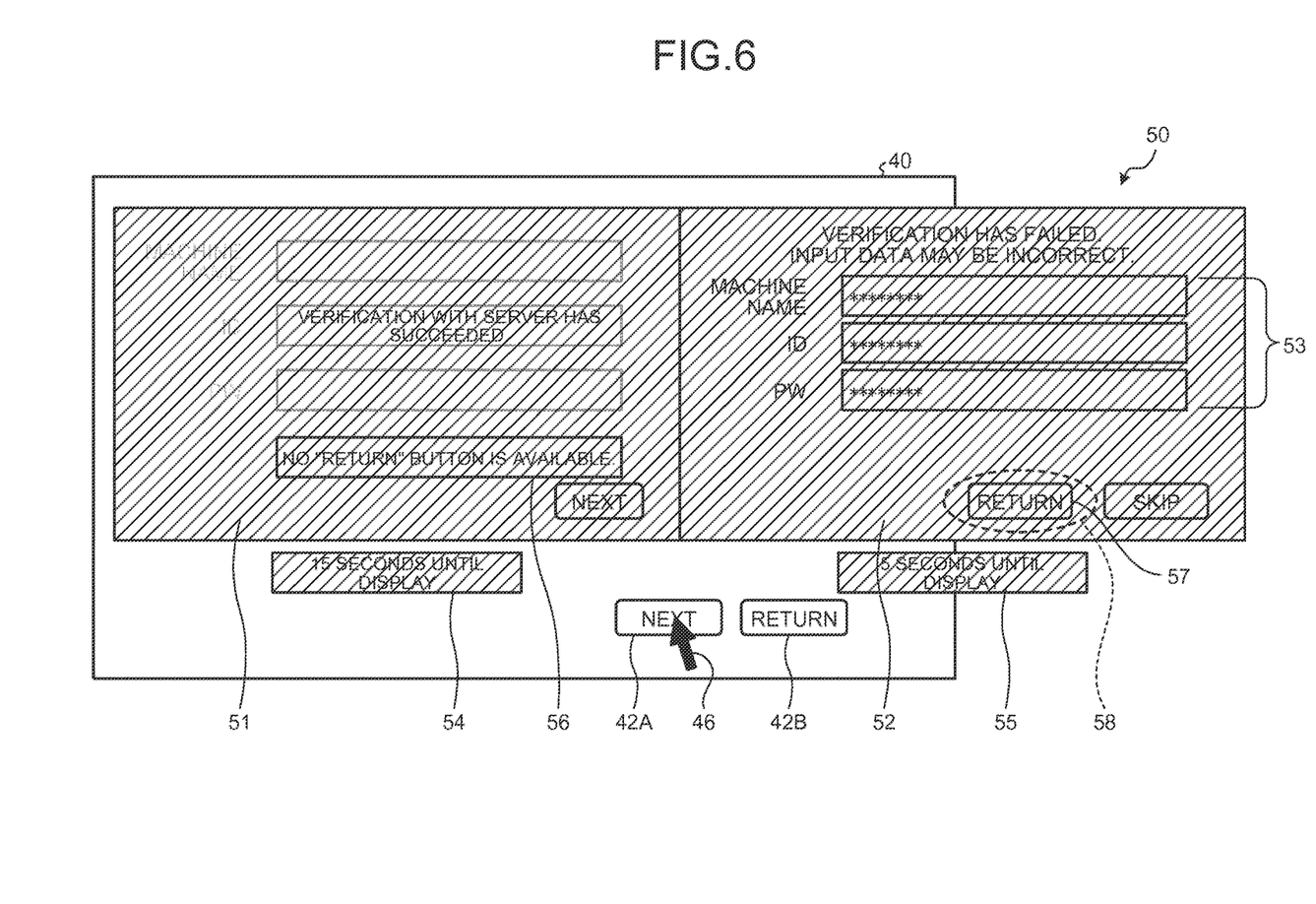
FIG. 6 depicts one example of a preview for next screen of the present embodiment.

FIG. 6 depicts one example of a preview for next screen 50 of the present embodiment. The preview for next screen. 50 shown in FIG. 6 is to let a user view a next screen to be transitioned when the command button 42A is selected in the screen 40 in advance, and is displayed in a superimposed manner on the screen 40, in the example shown in FIG. 6.

As for the next screen to be transitioned to when the command button 42A is selected in the screen 40, there are a next screen when the verification is successful and a next screen when the verification is unsuccessful. Therefore, the preview for next screen 50 shown in FIG. 6 is a screen in which a screen 51 to let the use view the next screen when the verification is successful and a screen 52 to let the user view the next screen when the verification is unsuccessful are collected. (combined).

Furthermore, the preview for next screen 50 shown in FIG. 6 is subjected to semitransparent process to show that it is not the next screen when the verification is successful or when the verification is unsuccessful, but the screen for previewing, and is a screen in a display mode different from a display mode of the next screen.

Furthermore, in the preview for next screen 50 shown in FIG. 6, because a display region 53 to display a machine name, an ID, and a PW that are input to the textbox 41 of the screen 40 is present in the screen 52 no let the user view the next screen when the verification is unsuccessful, asterisk symbols are arranged in the display region 53 to mask such data.

Moreover, in the preview for next screen 50 shown in FIG. 6, an estimate transition-time information 54 that indicates an estimated transition time (15 seconds) that is estimated to be required to transition from the screen 40 to she next screen when the verification is successful is arranged under the screen 51 to let the user view the next screen when the verification is successful. Similarly, in the preview for next screen 50 shown in FIG. 6, an estimated transition-time information 55 that indicates an estimated transition time (5 seconds) that is estimated to be required to transition from the screen 40 to the next screen when the verification is unsuccessful is arranged under the screen 52 to let the user view the next screen when the verification is unsuccessful.

Furthermore, in the preview for next screen. 50 shown in FIG. 6, because a command button to transition (return) to the screen 40 is not arrange in the next screen when the verification is successful, information 56 that informs the above is displayed in an emphasized manner in the screen 51. On the other hand, in preview for next screen 50 shown in FIG. 6, because a command button to transition. (return) to the screen 40 is arranged in the next screen when the verification is unsuccessful and the command button 57 is arranged in the screen 52 also, the command button 57 is displayed in an emphasized manner with a sign 53.

When a predetermined input is accepted by the accepting unit 34, the requesting unit 37 request performance of a function based on the predetermined input to the function performing unit 38. In the example shown in FIG. 5, when selection of the command button 42A is accepted by the accepting unit 34, the requesting unit 37 transmits data input to the textbox 41 to the function performing unit 38 to request verification.

The function performing unit 38 performs a function that is requested by the requesting unit 37, and transmits a screen relating to a result of performing the function to the display control unit 31 as the next screen described above. In the example shown in FIG. 5, the function performing unit 38 verifies the information transmitted from the requesting unit 37, and transmits a screen that indicates a verification result to the display control unit 31 as the next screen described above.

The display control, unit 31 is explained herein again.

Figure 7:
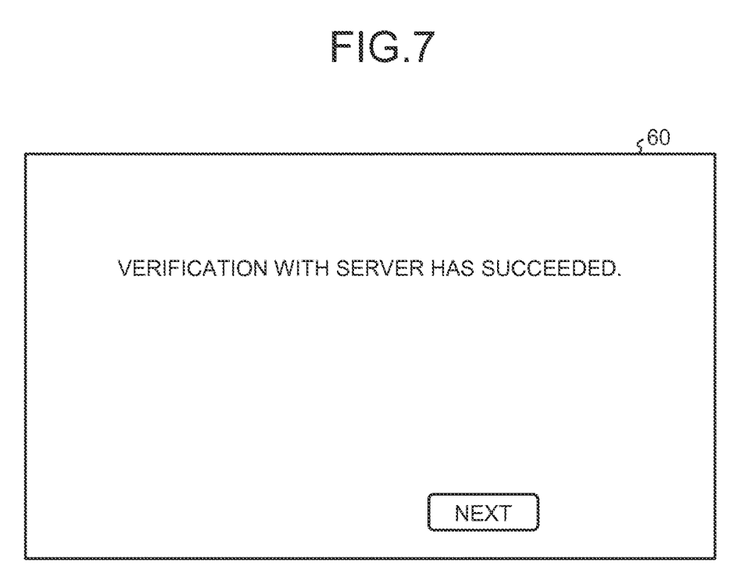
FIG. 7 depicts one example of a next screen of the present embodiment.

The display control unit 31 displays the screen that is transmitted from the function performing unit 38 on the display unit 32. FIG. 7 depicts one example of a next screen 60 of the present embodiment. The next screen 60 shown in FIG. 7 is the next screen when the verification is successful, and contents same as those of the screen 51 of the preview for next screen 50 are displayed.

Figure 8:
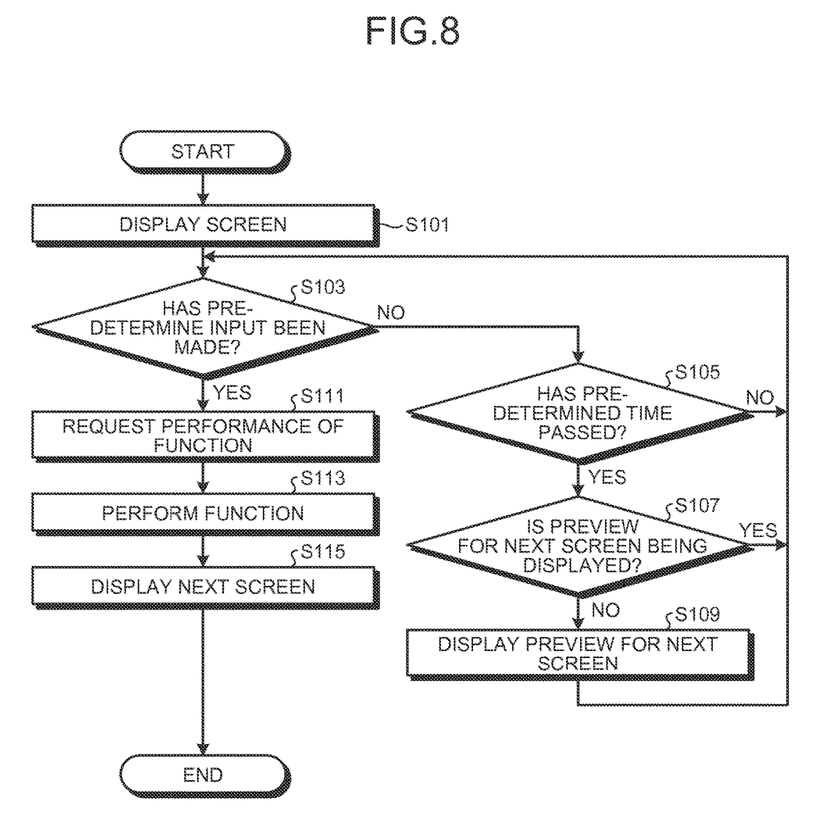
FIG. 8 is a flowchart showing one example of processing that is performed in the information processing system of the present embodiment.

FIG. 8 is a flowchart showing one example of processing that is performed in the information processing system 1 of the present embodiment.

First, the display control unit 31 displays a screen on the display unit 32 (step S101).

Subsequently, when the screen is displayed by the display control unit 31, the determining unit 35 checks whether a predetermined input is accepted by the accepting unit 34 (step S103), and when a predetermined input is not accepted (step S103: NO), determines whether a predetermined time has passed since the screen is displayed (step S105). When the predetermined time has not passed (step S105: NO), the processing returns to step S103.

When the predetermined time has passed (step S105: YES), the display control unit 31 displays, if a preview for next screen has not been displayed, the preview for next screen on the display unit 32 (step S109), and the processing returns to step S103. The display control unit 31 returns to step S103 when the preview for next screen has been displayed (step S107: YES).

Moreover, the requesting unit 37, when a predetermined input is accepted by the accepting unit 34 (step S103: YES), requests performance of a function based on the predetermined input to the function performing unit 38 (step S111).

Subsequently, the function performing unit 38 performs the function requested by the requesting unit 37, and transmits a screen relating to a result of performing the function to the display control unit 31 as the next screen described above (step S113).

Subsequently, the display control unit 31 displays the screen that is transmitted from the function performing unit 38 on the display unit 32 (step S115).

As described, according to the first embodiment, before transitioning from a screen to a next screen, a preview for next screen to let a user view the next screen in advance can be displayed, the user can see a processing result in advance, and such a load on the user that cannot predict a processing result can be suppressed.

Moreover, according to the first embodiment, whether transition from a next screen to a screen (previous screen) is possible is displayed in an emphasized manner in the preview for next screen, and therefore, it is possible to let a user grasp whether the processing result is finalized with transition to a next screen.

First Modification

While a case in which the number of the command button to transition to a next screen is one has been explained in the above embodiment, a case in which more than one command button to transition to a next screen is present is explained, in a first modification.

In the first modification, a first to an n-th command buttons that indicate transition to next screens, respectively are arranged in a screen.

In this case, the determining unit 35 determines, when the display condition is satisfied, which one of preview for next screen out of a first to a n-th previews for next screen that correspond to the first to she n-th next screens, respectively, based on a distance between a cursor and each of the first to the n-th command buttons. For example, the determining unit 35 determines to display a preview for next screen of a next screen to be transitioned to when a command button having the shortest distance from the cursor out of the first to the n-th previews for next screen.

The display control unit 31 displays the preview for next screen determined to be displayed out of the first to the n-th previews for next screens on the display unit 32.

Moreover, the determining unit 35 checks, when the display control unit 31 displays the preview for next screen, whether an input to move a cursor is accepted by the accepting unit 34, and further determines whether the cursor has moved.

The display control unit 31 displays the first to the n-th previews for next screens sequentially on the display unit 32 while the determining unit 35 determines that the cursor has not moved. For example, the display control unit 31 performs processing of displaying, when the first preview for next screen is displayed, the second preview for next screen after a predetermined time has passed, and of displaying the third preview for next screen after another predetermined time has passed, in the sequence of the second preview for next screen, the third preview for next screen, . . . , the (n−1)-th preview for next screen, and the n-th preview for next screen.

Figure 9:
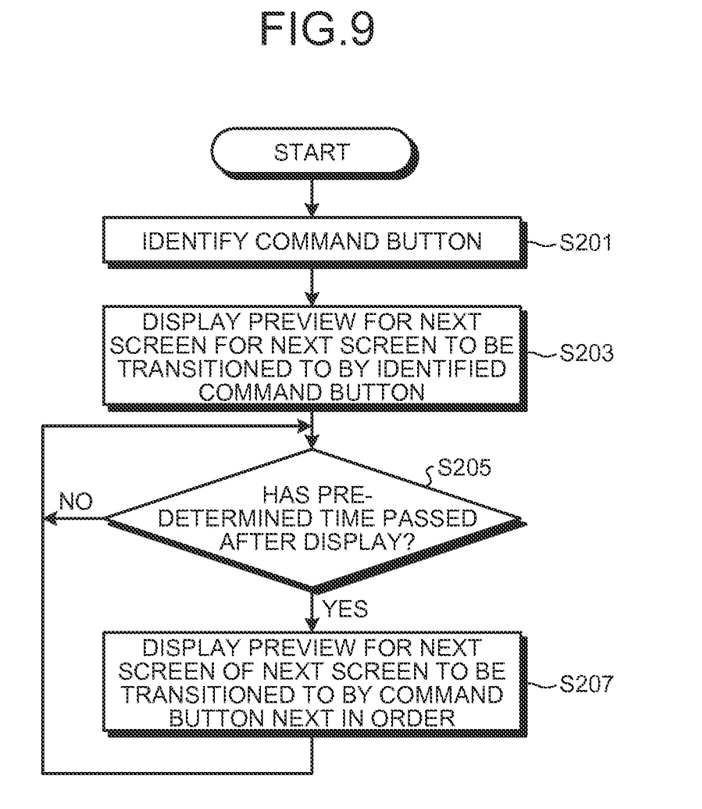
FIG. 9 is a flowchart showing one example of display processing of preview for next screen that is performed in the information processing system of the present embodiment.

FIG. 9 is a flowchart showing one example of display processing of preview for next screen that is performed in the information processing system 1 of the present embodiment.

First, when the display condition is satisfied, the determining unit 35 identifies a command button that has the shortest distance from the cursor (step S201), and the display control unit 31 displays the overview for next screen of the next screen to be transitioned to when the command button identified by the determining unit 35 is selected out of the first to the n-th previews for next screen (step S203).

Subsequently, when a predetermined time has passed after displaying the preview for next screen. (step S205: YES), the display control unit 31 displays the preview for next screen of the next screen to be transitioned to when a command button next in the order is selected on the display unit 32 (step S207), and the process returns to step S205.

Note that the order may be of, for example, the first command button→the second command button→the third command button→ . . . →the n−1-th command button→the n-th command button, the first command button→ . . . .

Moreover, the processing at steps S205 to S207 is performed during when the determining unit 35 determines that the cursor is not moved.

According to a second embodiment, even when more than one command button to transition to a next screen is present, a preview for next screen of the next screen to be transitioned to by each command button can be displayed, and therefore, a user can be informed of each processing result in advance, and a load on the user that cannot predict a processing result can be suppressed.

Second Modification

Although a case in which a preview for next screen to let a user view a next screen in advance is displayed has been explained in the above embodiment, it may be configured such that, a preview screen for a screen after a next screen to let the user view a screen after the next screen to be transitioned to from the next screen is also displayed.

In this case, when a preview for next screen is displayed, the determining unit 35 checks an input that is accepted by the accepting unit 34, and determines whether the preview for next screen is specified by the cursor (whether the cursor is moved onto the preview for next screen).

When the preview for next screen is specified, the display control unit 31 displays a preview for one after next screen on the display unit 32. The appearance of the preview for one after next screen may be made similarly to the preview for next screen.

Third Modification

Although an example in which a preview for next screen is prepared in advance has been explained in the above embodiment, it may be configured such that a preview for next screen is created from a next screen that is transmitted from the function performing unit 38, and is used next time and after.

For example, when a next screen after the screen 40 is transmitted from the function performing unit 38, the display control unit 31 analyzes characters in the next screen, and determines whether it is the next screen when the verification is successful or the next screen when the verification is unsuccessful. Furthermore, for example, the display control unit 31 analyzes characters in the next screen, and determines whether data that is input to the screen 40 by a user is displayed, and if displayed, masks the data. Moreover, for example, the display control unit 31 determines whether a command button to transition to a previous screen, such as a return button, is arranged on the next screen, and if arranged, displays the command button in an emphasized manner, and if not arranged, displays that transition (return) to the previous screen is disabled, in an emphasized manner. Whether a command button is arranged can be determined by image recognition, or by checking a creation log of the next screen if the next screen is created by a software development kit (SDK). The display control unit 31 stores the preview for next screen thus created in the next-screen-preview storage unit 36. The display control unit 31 may combine a preview for next screen of a next screen when verification is successful and a preview for next screen of a next screen when verification is unsuccessful, if both are available in the storage, to display as the preview for next screen as shown in FIG. 6.

Program

A program that is executed by the terminal device 10 and the server device 20 (hereinafter, "respective devices of the above embodiment and the respective modifications) of the above embodiment and the respective modifications is stored in a computer-readable recording medium, such as a compact-disk read-only memory (CD-ROM), a compact disk recordable (CDR), a memory card, a digital versatile disk (DVD), and a flexible disk (FD), in a file of an installable format or in an executable format, to be provided.

Alternatively, the program that is executed by the respective devices of the above embodiment and the respective modifications may be stored in a computer that is connected to a network such as the Internet so as to be provided by being downloaded through the network. Alternatively, the program that is executed by the respective devices of the above embodiment and the respective modifications may be provided or distributed through a network such as the Internet. Alternatively, the program that is executed by the respective devices of the above embodiment and the respective modifications may be installed in a. RUM or the like in advance to be provided.

The program that is executed by the respective devices of the above embodiment and the respective modifications has a module structure to implement the respective components described above on a computer. As actual hardware, for example, the CPU reads the program on the RAM from the RUM and executes the program, thereby implementing the respective components on the computer.

According to the present embodiments, an effect that a load on a user that cannot predict a processing result can be suppressed is produced.

The present invention can be implemented in any convenient form, for example using dedicated hardware, or a mixture of dedicated hardware and software. The present invention may be implemented as computer software implemented by one or more network processing apparatus. The network can comprise any conventional terrestrial or wireless communications network, such as the Internet. The processing apparatus can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implemental on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing system comprising:
a non-transitory medium to store programs of executable instructions;
one or more processors configured by execution of the executable instructions to perform, by the one or more processors collectively, a method comprising
(a) displaying on a display device a displayed screen, from which to transition to a next screen selected from plural candidate next screens, based on a user-specified predetermined command selectable on the displayed screen, to activate processing by the system corresponding to the user-specified command
(b) determining, when the user-specified predetermined command has not been made via the displayed screen, whether a display condition for displaying a preview of the next screen prior to transitioning to the next screen is satisfied; and
(c) displaying the preview of the next screen on the display device when the display condition is satisfied, the displayed preview including both (i) a first next screen review corresponding to a first processing result of processing the user-specified predetermined command and (ii) a second next screen preview corresponding to another processing result, distinct from the first processing result, of processing the user-specified predetermined command.

2. The information processing system according to claim 1, wherein the preview of the next screen is a screen that is obtained by manipulating the next screen.

3. The information processing system according to claim 2, wherein when a region in which data that is input by a user is displayed is present in the next screen, information to mask the data is arranged in a corresponding region in at least one of the first next screen preview and the second next screen preview.

4. The information processing system according to claim 2, wherein in the first next screen preview and the second next screen preview, an estimated transition time that is estimated to be required to transition from the displayed screen to the next screen is arranged.

5. The information processing system according to claim 2, wherein in the first next screen preview and the second next screen preview, whether transition from the next screen back to the displayed screen is enabled is indicated in an emphasized manner.

6. The information processing system according to claim 2, wherein at least one of the first next screen preview and the second next screen preview is in a display mode different from a display mode of the next screen.

7. The information processing system according to claim 1, wherein the user-specified predetermined command is an input of selecting a transition symbol that indicates to transition to the next screen by using a specification symbol that moves based on an operation by a user.

8. The information processing system according to claim 1, wherein the method performed by the by the one or more processors collectively further comprises:
registering each of the first next screen preview and the second next screen preview in a storage device;
determining that the display condition for displaying the preview of the next screen is satisfied upon determining that the user-specified predetermined command has not been received in a predetermined period of time since start of the display of the displayed screen and that a preview of the next screen is not being displayed;
combining, when the display condition is satisfied, the first next screen preview and the second next screen preview included in the preview of the next screen displayed prior to transitioning to the next screen, and superimposing the first next screen preview and the second next screen preview on the displayed screen, the first next screen preview and the second next screen preview having been acquired from the storage device; and
replacing by the next screen, upon receiving the user-specified predetermined command, the displayed screen on which the first next screen preview and the second next screen preview are superimposed thereon.

9. An information processing system comprising:
a non-transitory medium to store programs of executable instructions;
one or more processors configured by execution of the executable instructions to perform, by the one or more processors collectively, a method comprising
(a) displaying on a display device a displayed screen, from which to transition to a next screen selected from plural candidate next screens, based on a user-specified predetermined command selectable on the displayed screen, to activate processing by the system corresponding to the user-specified command, the user-specified command being an input of selecting a transition symbol that indicates to transition to the next screen by using a specification symbol that moves based on an operation by a user;

(b) determining, when the user-specified predetermined command has not been made via the displayed screen, whether a display condition for displaying a preview of the next screen prior to transitioning to the next screen is satisfied;

(c) displaying the preview of the next screen on the display device when the display condition is satisfied;

(d) arranging in the displayed screen, first to n-th transition symbols (n≥2) indicating transition to first to n-th next screens, respectively;

(e) determining, when the display condition is satisfied, which preview of the next screen is to be displayed out of first to n-th previews of the next screen corresponding to the first to the n-th next screens, respectively, based on a distance between the specification symbol and each of the first to the n-th transition symbols; and (f) displaying a preview of the next screen that is determined to be displayed out of the first to the n-th previews of the next screen on the display device.

10. The information processing system according to claim 8, wherein the method performed by the processor further comprises:

determining whether the specification symbol has been moved after display of the preview of the next screen; and sequentially displaying the first to the n-th previews of the next screen on the display device, while the specification symbol is not moved.

11. The information processing system according to claim 7, wherein the method performed by the processor further comprises:

determining whether the preview of the next screen is specified by the specification symbol, after display of the preview of the next screen; and displaying, when the preview of the next screen is specified, a preview of a screen to be displayed after the next screen, to be transitioned to from the next screen.

12. An information processing device comprising:

one or more processors configured to execute one or more programs of instructions stored in a non-transitory medium to perform a method comprising (a) displaying on a display device a displayed screen, from which to transition to a next screen selected from plural candidate next screens, based on a user-specified predetermined command selectable on the displayed screen, to activate processing by the system corresponding to the user-specified command (b) determining, when the user-specified predetermined command has not been made via the displayed screen, whether a display condition for displaying a preview of the next screen prior to transitioning to the next screen is satisfied; and (c) displaying the preview of the next screen on the display device when the display condition is satisfied, the displayed preview including both (i) a first next screen preview corresponding to a first processing result of processing the user-specified predetermined command and (ii) a second next screen preview corresponding to another processing result, distinct from the first processing result, of processing the user-specified predetermined command.

* * * * *